(12) United States Patent
Devarakonda et al.

(10) Patent No.: US 12,020,040 B2
(45) Date of Patent: Jun. 25, 2024

(54) DESIRED STATE MANAGEMENT OF SOFTWARE-DEFINED DATA CENTERS WITH A PLURALITY OF DESIRED STATE CONFIGURATIONS

(71) Applicant: VMware, Inc., Palo Alto, CA (US)

(72) Inventors: Kalyan Devarakonda, Bangalore (IN); Praveen Tirumanyam, Bangalore (IN)

(73) Assignee: VMware LLC, Palo Alto, CA (US)

( * ) Notice: Subject to any disclaimer, the term of this patent is extended or adjusted under 35 U.S.C. 154(b) by 21 days.

(21) Appl. No.: 17/711,937

(22) Filed: Apr. 1, 2022

(65) Prior Publication Data

US 2023/0315486 A1 Oct. 5, 2023

(51) Int. Cl.
*G06F 9/445* (2018.01)

(52) U.S. Cl.
CPC .............................. *G06F 9/44505* (2013.01)

(58) Field of Classification Search
CPC ..... G06F 8/65; G06F 9/44505; H04L 41/084; H04L 41/0895
USPC ....... 709/220–221; 718/1; 717/121; 713/100
See application file for complete search history.

(56) References Cited

U.S. PATENT DOCUMENTS

| | | | | |
|---|---|---|---|---|
| 10,135,727 | B2 * | 11/2018 | Gude | H04L 45/56 |
| 10,331,460 | B2 * | 6/2019 | Kommineni | G06F 9/44505 |
| 10,628,144 | B2 * | 4/2020 | Myneni | G06F 9/45558 |
| 10,838,712 | B1 * | 11/2020 | Mukhopadhyay | G06F 8/61 |
| 10,855,464 | B2 * | 12/2020 | Nirwal | H04L 9/0891 |
| 10,915,350 | B2 * | 2/2021 | Shil | H04L 67/34 |
| 10,944,722 | B2 * | 3/2021 | Popuri | H04L 63/029 |
| 11,063,811 | B2 * | 7/2021 | Shil | H04L 41/0618 |
| 11,321,069 | B2 * | 5/2022 | Hall | H04L 63/0272 |
| 11,658,868 | B2 * | 5/2023 | Velikov | H04L 41/084 |
| | | | | 709/221 |
| 11,722,372 | B2 * | 8/2023 | Raj | H04L 41/0816 |
| | | | | 709/220 |

(Continued)

OTHER PUBLICATIONS

Dell—"The Future of the Data Center", 6 pages, Dated Mar. 2016 (Year: 2016).*

(Continued)

*Primary Examiner* — Brian T Misiura
(74) *Attorney, Agent, or Firm* — Kim & Stewart LLP

(57) ABSTRACT

A method of managing configurations of SDDCs of a tenant includes the steps of: retrieving a base configuration document, a first supplemental configuration document of a first SDDC, and a second supplemental configuration document of a second SDDC; issuing, to the first SDDC, a first instruction to update a running configuration state thereof according to the base configuration document and the first supplemental configuration document; and issuing, to the second SDDC, a second instruction to update a running configuration state thereof according to the base configuration document and the second supplemental configuration document, wherein the base configuration document includes settings of first configuration properties common across all of the tenant's SDDCs, the first supplemental configuration document includes first settings of second configuration properties only applicable to the first SDDC, and the second supplemental configuration document includes second settings of the second configuration properties only applicable to the second SDDC.

24 Claims, 12 Drawing Sheets

(56) References Cited

U.S. PATENT DOCUMENTS

| | | | | |
|---|---|---|---|---|
| 2014/0173065 A1* | 6/2014 | Sears | .................... | H04L 41/145 |
| | | | | 709/221 |
| 2017/0317928 A1* | 11/2017 | Gude | ...................... | H04L 45/72 |
| 2020/0012505 A1* | 1/2020 | Shil | ......................... | H04L 67/10 |
| 2020/0344109 A1* | 10/2020 | Shil | ......................... | H04L 41/0233 |
| 2023/0026183 A1* | 1/2023 | Manoharan | ............. | G06F 9/505 |
| 2023/0030000 A1* | 2/2023 | Sinha | ................... | G06F 9/45558 |
| 2023/0106877 A1* | 4/2023 | Simeonov | ............... | G06F 11/07 |
| | | | | 717/170 |
| 2023/0109215 A1* | 4/2023 | Petrov | ................. | G06F 16/2282 |
| | | | | 717/121 |
| 2023/0177067 A1* | 6/2023 | Sinha | ................... | G06Q 10/087 |
| | | | | 707/610 |
| 2023/0185627 A1* | 6/2023 | Gupta | ........................ | G06F 8/62 |
| | | | | 718/1 |
| 2023/0229478 A1* | 7/2023 | Gorai | ........................ | G06F 8/65 |
| | | | | 718/1 |

OTHER PUBLICATIONS

Fujitsu—"White Paper—Software-Defined Data Center, infrastructure for enterprise digital transformation"; 16 pages, Dated 2020 (Year: 2020).*

Dell—"VMware vSphere Life Cycle Manager (vLCM) and Dell EMC integration"; 18 pages, Dated Jun. 4, 2020 (Year: 2020).*

\* cited by examiner

Figure 2D

Create Supplemental Configuration Document

Base Configuration Name  BaseConfigOS-2

Supplemental Configuration Name  SuppConfig-ReduceCompute

Available Attributes for Supplemental Configuration

General
- ☐ Tags  dev.stg.prd
- ☐ Login Message

Security
- ☐ SSH Enabled
- ☐ Token Timeout  30

Inventory
- ☒ No. of Hosts
  - Minimum  3
  - Maximum  6
- ☒ CPU Count  8
  - ☐

Apply to Following SDDCs
- ☒ sc2-10-185-230-235.eng.vmware.com
- ☐
- ☐ sc2-10-164-2-18.eng.vmware.com
- ☒ sc1-10-185-85-119.eng.vmware.com
- ☒ sc2-10-185-168-235.eng.vmware.com ☒ Enforce from 10:00 PM ▼ to 06:00 AM ▼ Every Business Day ▼

[Create]  [Cancel]

Figure 2F

DESIRED STATE MANAGEMENT OF SOFTWARE-DEFINED DATA CENTERS WITH A PLURALITY OF DESIRED STATE CONFIGURATIONS

BACKGROUND

A software-defined data center (SDDC) includes virtual infrastructure (VI) such as virtual compute, storage, and networking resources. Management software provisions the VI from hardware infrastructure, including host computers and storage and networking devices. The management software communicates with each of the host computers via virtualization software installed thereon.

As described in U.S. patent application Ser. No. 17/464, 733, filed on Sep. 2, 2021, the entire contents of which are incorporated herein by reference, a declarative document may define the desired state of the SDDC. The desired state specifies desired settings of the various components of the SDDC, e.g., a number of clusters of host computers, a numbers of hosts to be managed per cluster, and whether to enable features such as distributed resource scheduling (DRS), high availability, workload control plane, and network virtualization. Following a declarative approach, the SDDC is deployed or upgraded according to the desired state. This approach has simplified the deployment and upgrading of SDDCs.

However, in certain situations, a tenant of an SDDC may wish to define multiple of such declarative documents to be "valid." For example, through DRS, the management software may change configurations of the SDDC such that the running configuration state no longer matches an assigned declarative document. If the drift is within a range that the tenant considers acceptable, the tenant may not want the running configuration state of the SDDC to be remediated. As another example, the tenant may wish to adjust configurations of the SDDC based on factors such as the time of day or the day of the week such as by decreasing resource consumption at night or during the weekend. Therefore, an effective method for managing the desired states of SDDCs for which there are multiple valid configurations, is needed.

SUMMARY

Accordingly, one or more embodiments provide a method of managing configurations of a plurality of SDDCs of a tenant, the plurality of SDDCs including a first SDDC and a second SDDC. The method includes the steps of: retrieving a base configuration document of the tenant, a first supplemental configuration document of the first SDDC, and a second supplemental configuration document of the second SDDC; issuing, to the first SDDC, a first instruction to update a running configuration state of the first SDDC according to the base configuration document and the first supplemental configuration document; and issuing, to the second SDDC, a second instruction to update a running configuration state of the second SDDC according to the base configuration document and the second supplemental configuration document, wherein the base configuration document includes settings of first configuration properties, the settings of the first configuration properties being common across all of the tenant's SDDCs. The first supplemental configuration document includes first settings of second configuration properties, the first settings of the second configuration properties being applicable to the first SDDC but inapplicable to the second SDDC, and the second supplemental configuration document includes second settings of the second configuration properties, the second settings of the second configuration properties being applicable to the second SDDC but inapplicable to the first SDDC.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2D is an illustration of a UI for creating a base configuration document of a tenant according to a second embodiment in which the base configuration document is created from a single legacy desired configuration document.

FIG. 2F is an illustration of a UI for creating a new supplemental configuration document for one or more SDDCs.

DETAILED DESCRIPTION

Techniques for managing the desired states of SDDCs for which there are multiple valid configurations, are described. According to embodiments, the desired state of an SDDC is defined by two documents: a "base configuration document" and a "supplemental configuration document." The base configuration document includes settings that are common across all of the tenant's SDDCs, while the supplemental configuration document includes settings that may vary across the tenant's SDDCs and that may vary over time. Accordingly, each of the tenant's SDDCs is assigned and configured according to the same base configuration document and one of the supplemental configuration documents.

At run time, for each SDDC, the base configuration document and a supplemental configuration document are "stitched together" to create a single desired state for application to the SDDC. Later, if the running configuration state of the SDDC becomes noncompliant with the desired state, remediation is performed based on the reason for the noncompliance. If the noncompliance is with settings from the base configuration document, the SDDC is remediated so that its running configuration state complies with the desired state. On the other hand, if the noncompliance is with settings from the supplemental configuration document, a cloud control plane determines if the tenant has a different supplemental configuration document that more closely matches the running configuration state of the SDDC. If there is such a supplemental configuration document, the cloud control plane assigns the closer supplemental configuration document to the SDDC. A new desired state is then created from the base configuration document and the newly assigned supplemental configuration document. Accordingly, the tenant is able to define multiple valid configuration states for each SDDC by creating multiple supplemental configuration documents. These and further aspects of the invention are discussed below with respect to the drawings.

Figure 1:
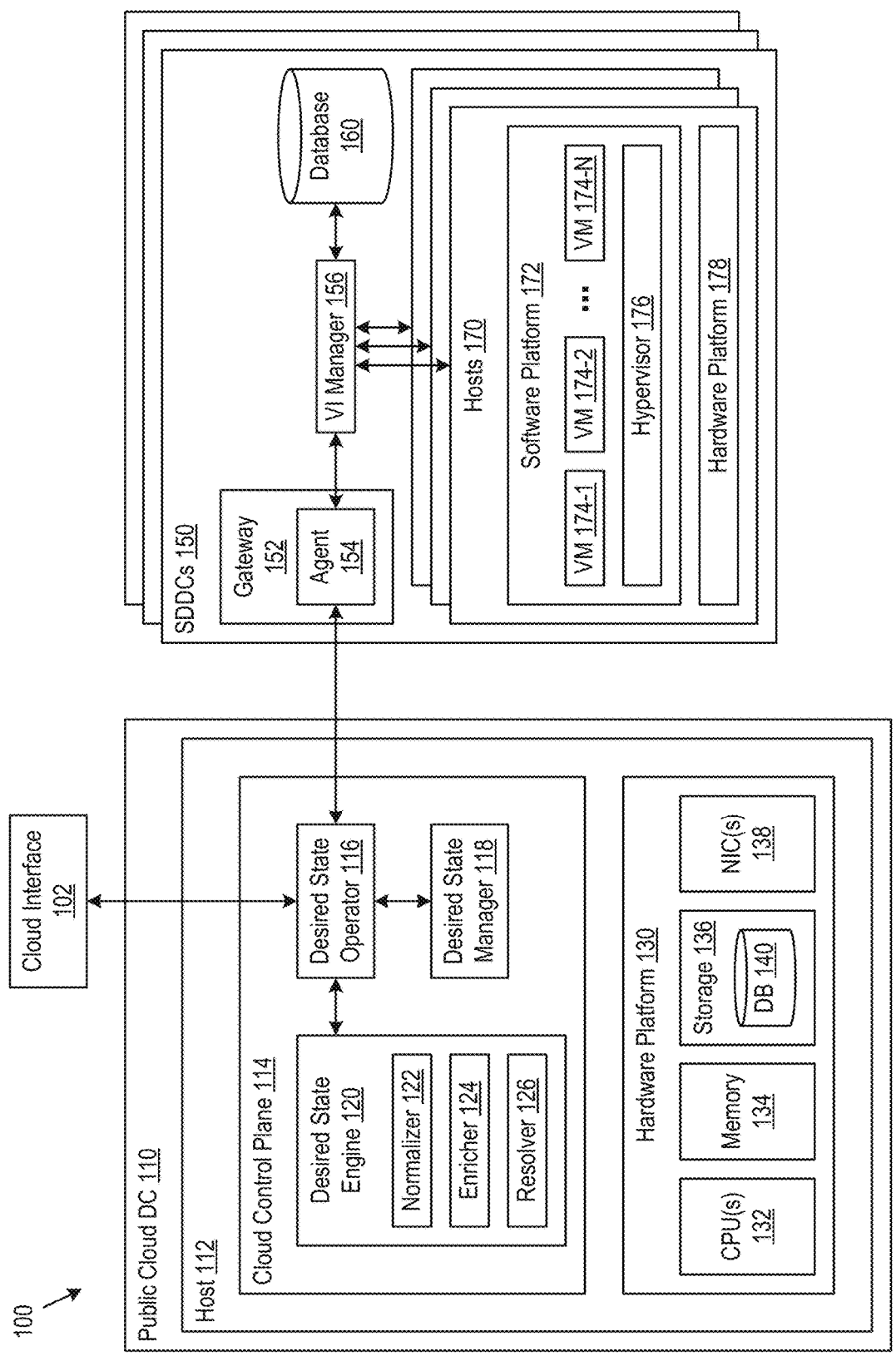
FIG. 1 is a block diagram of a virtualized computer system in which embodiments may be implemented.

FIG. 1 is a block diagram of a virtualized computer system 100 in which embodiments may be implemented. Virtualized computer system 100 includes a cloud control plane 114 implemented in a host 112 of a public cloud data center (DC) 110 and a plurality of SDDCs 150 that are managed through cloud control plane 114.

Public cloud DC 110 is operated by a cloud computing service provider and is accessible by multiple tenants through a cloud interface 102 such as a UI or application programming interface (API). Although only one host 112 is illustrated in FIG. 1, it should be understood that public cloud DC 110 includes several hosts and that elements and functionalities of cloud control plane 114 may execute on a plurality of hosts. Furthermore, although FIG. 1 illustrates public cloud DC 110, SDDCs 150 may instead by managed though a cloud control plane deployed in an on-premise data center that is controlled and administered by a particular enterprise or across multiple data centers, public or otherwise.

Host 112 is constructed on a server grade hardware platform 130 such as an x86 architecture platform. Hardware platform 130 includes conventional components of a computing device, such as one or more central processing units (CPUs) 132, memory 134 such as random-access memory (RAM), local storage 136 such as one or more magnetic drives or solid-state drives (SSDs), and one or more network interface cards (NICs) 138. CPU(s) 132 are configured to execute instructions such as executable instructions that perform one or more operations described herein, such executable instructions being stored in memory 134. Storage 136 includes a database 140 that stores desired state documents for SDDCs 150, including base and supplemental configuration documents. Database 140 also stores "legacy desired configuration documents," as discussed further below. NIC(s) 138 enable host 112 to communicate with other devices.

Each tenant manages one or more SDDCs 150 via cloud interface 102 by defining desired states, each desired state including a base configuration document and a supplemental configuration document. As previously mentioned, each of a tenant's SDDCs 150 is assigned and configured according to the same base configuration document but not necessarily the same supplemental configuration document. Through cloud interface 102, the tenant issues commands such as: (1) to get the desired state or running configuration state of one of SDDCs 150, (2) to create a new desired state for one of SDDCs 150, (3) to check if the running configuration state of one of SDDCs 150 complies with its desired state, and (4) to apply a desired state to one of SDDCs 150.

Cloud control plane 114 includes various software modules for managing desired states, including a desired state operator 116, a desired state manager 118, and a desired state engine 120. Desired state operator 116 acts as an intermediary between cloud interface 102, desired state manager 118, desired state engine 120, and SDDCs 150. For example, desired state operator 116 receives commands from the tenant via cloud interface 102, provides information to the tenant via cloud interface 102, requests desired state manager 118 and desired state engine 120 to perform functionalities thereof, and handles requests from SDDCs 150. Although not illustrated in FIG. 1, public cloud DC 110 includes a gateway service that routes cloud inbound connections to desired state operator 116 and that routes responses from desired state operator 116 to SDDCs 150.

Desired state manager 118 stores a base configuration document and supplemental configuration documents for the tenant in database 140. In response to a request for base and/or supplemental configuration documents, desired state manager 118 provides the requested documents to desired state operator 116. Furthermore, when a base and supplemental configuration document are assigned to one of SSDCs 150, desired state manager 118 stores, in database 140, metadata indicating the assignment.

Desired state engine 120 handles requests communicated by desired state operator 116, including requests to create a desired state and to reassign desired states to SDDCs 150, e.g., in response to drift or according to a schedule. Desired state engine 120 includes a normalizer submodule 122 and enricher submodule 124 for creating the desired states, and a resolver submodule 126 for reassigning the desired states. The creation of desired states is discussed further below in conjunction with FIGS. 2A-2F, and the reassignment of desired states is discussed further below in conjunction with FIGS. 4A-4B.

Some SDDCs 150 of a tenant may be deployed in on-premise data centers, i.e., in "private clouds," while other SDDCs 150 may be deployed in public clouds. SDDCs 150 may also be deployed across different geographical regions for reasons such as to avoid SDDCs 150 being subject to the same natural disasters. Each of SDDCs 150 includes a gateway appliance 152 and a VI manager appliance 156 provisioned from VI, and one or more clusters of hosts 170.

Gateway 152 includes an agent 154 that communicates with desired state operator 116 to retrieve tasks such as to check if the running configuration state of SDDC 150 complies with the assigned desired state thereof. Agent 154 transmits tasks to VI manager 156, and when the tasks have been completed, agent 154 transmits execution results to desired state operator 116.

VI manager 156 stores the base and supplemental configuration documents assigned to SDDC 150, in a database 160. At run time, VI manager 156 stitches the base and supplemental configuration documents together to create an overall desired state. VI manager 156 then applies the desired state of hosts 170 and other appliances (not shown) to update the running configuration state of SDDC 150 to match all the settings of the desired state. The application of a desired state is discussed further below in conjunction with FIG. 2C.

Each of hosts 170 is constructed on a server grade hardware platform 178 such as an x86 architecture platform. Like hardware platform 130, hardware platform 178 includes conventional components of a computing device such as one or more CPUs, memory, local storage, and NICs (not shown). Hardware platform 178 supports a software platform 172. Software platform 172 includes a hypervisor 176, which is a virtualization software layer. Hypervisor 176 supports a virtual machine (VM) execution space within which VMs 174 are concurrently instantiated and executed. One example of hypervisor 176 is a VMware ESX® hypervisor from Vmware, Inc. Although the disclosure is described with reference to VMs, the teachings herein also apply to nonvirtualized applications and to other types of virtual computing instances such as containers, Docker® containers, data compute nodes, and isolated user space instances.

Figure 2A:
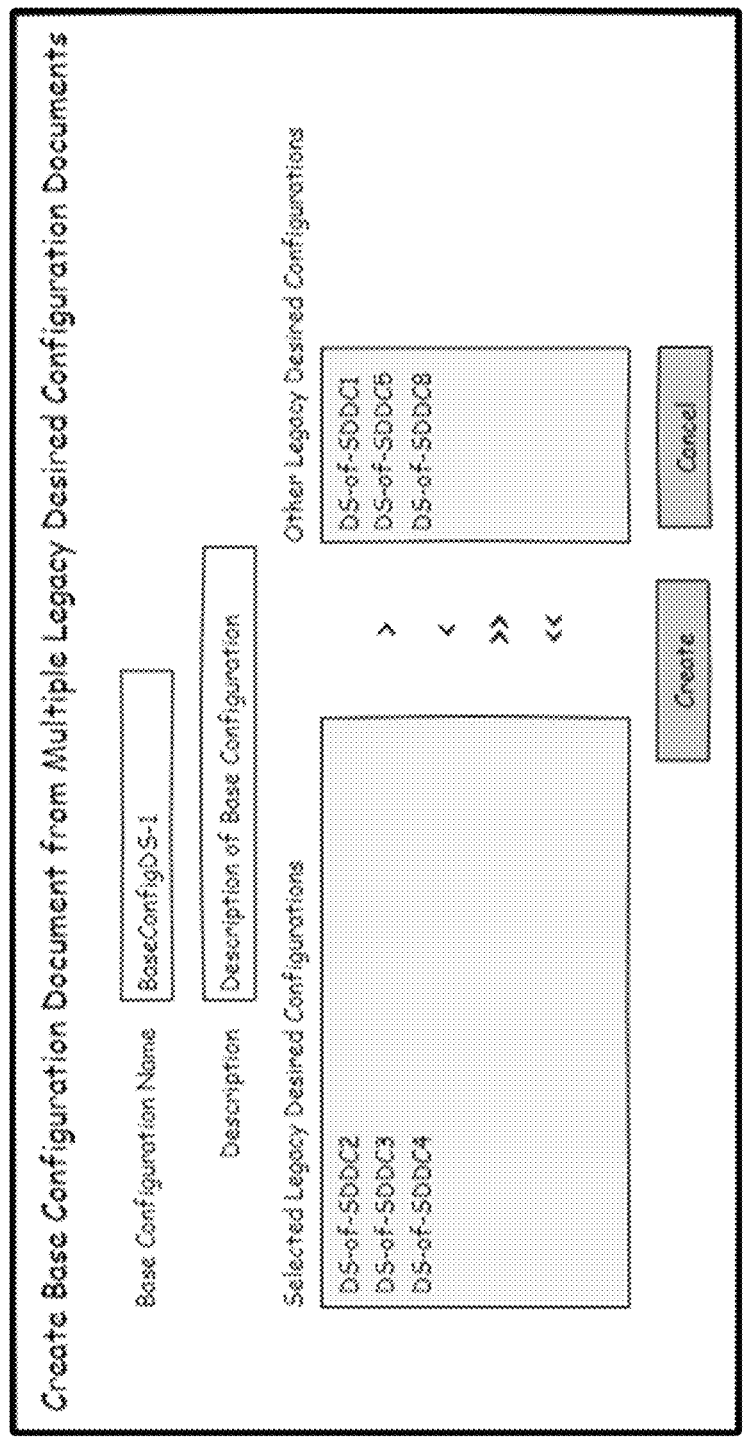
FIG. 2A is an illustration of a user interface (UI) for creating a base configuration document of a tenant according to a first embodiment in which the base configuration document is created from a plurality of selected legacy desired configuration documents.

FIG. 2A is an illustration of a UI of cloud interface 102 for creating a base configuration document of a tenant according to a first embodiment in which the base configuration document is created from a plurality of selected legacy desired configuration documents. A legacy desired configuration document includes desired settings of all the configuration properties of one of SDDCs 150, i.e., is not broken up into base and supplemental configuration documents.

In the illustration of FIG. 2A, the tenant is naming the new base configuration document "BaseConfigDS-1." In the UI, the tenant has access to six legacy desired configuration documents: "DS-of-SDDC1," "DS-of-SDDC2," "DS-of-SDDC3," "DS-of-SDDC4," "DS-of-SDDC5," and "DS-of-SDDC8." The tenant can select legacy desired configuration documents for creating the new base configuration document, by moving them from the right side of the UI, labeled "Other Legacy Desired Configurations," to the left side of the UI, labeled "Selected Legacy Desired Configurations." Based on the current selections, if the tenant presses "Create," desired state engine 120 will create the new base configuration document from "DS-of-SDDC2," "DS-of-SDDC3," and "DS-of-SDDC4." Desired state engine 120 will also create supplemental configuration documents, as discussed further below.

Figure 2B:
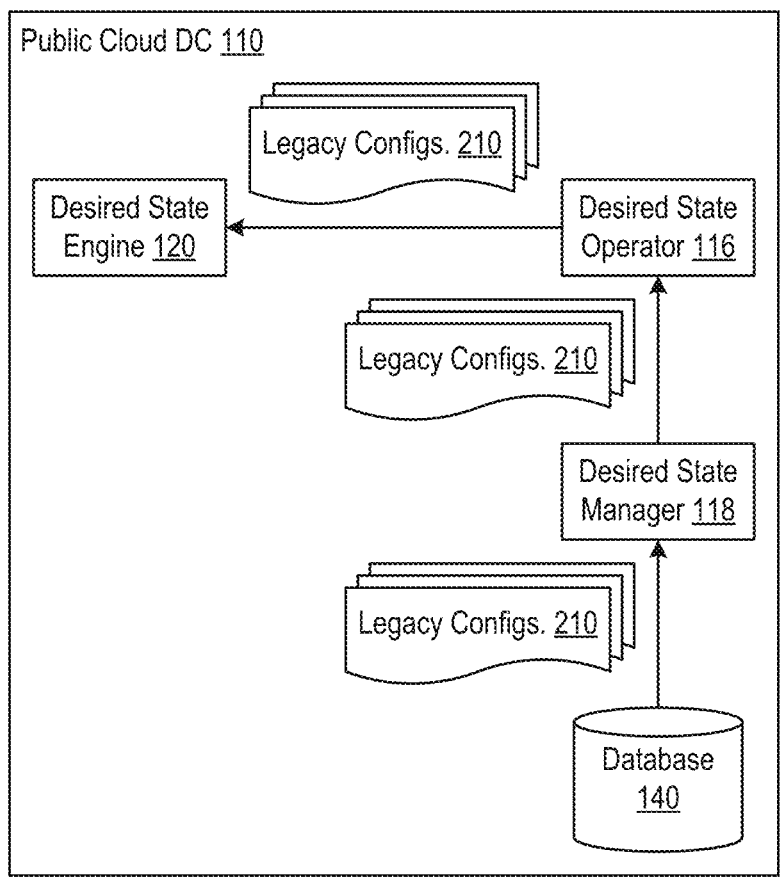
FIG. 2B is a system diagram illustrating the communication of the plurality of selected legacy desired configuration documents to a desired state engine that creates the base configuration document and supplemental configuration documents therefrom, according to the first embodiment.

FIG. 2B is a system diagram illustrating the communication of a plurality of selected legacy desired configuration documents 210 to desired state engine 120, according to the first embodiment. Once the tenant communicates the decision to create the new base configuration document, cloud interface 102 transmits the tenant's selection to desired state operator 116, which instructs desired state manager 118 to fetch selected legacy desired configuration documents 210 from database 140. Desired state manager 118 then fetches legacy desired configuration documents 210 from database 140 and provides them to desired state operator 116, which forwards them to desired state engine 120.

Figure 2C:
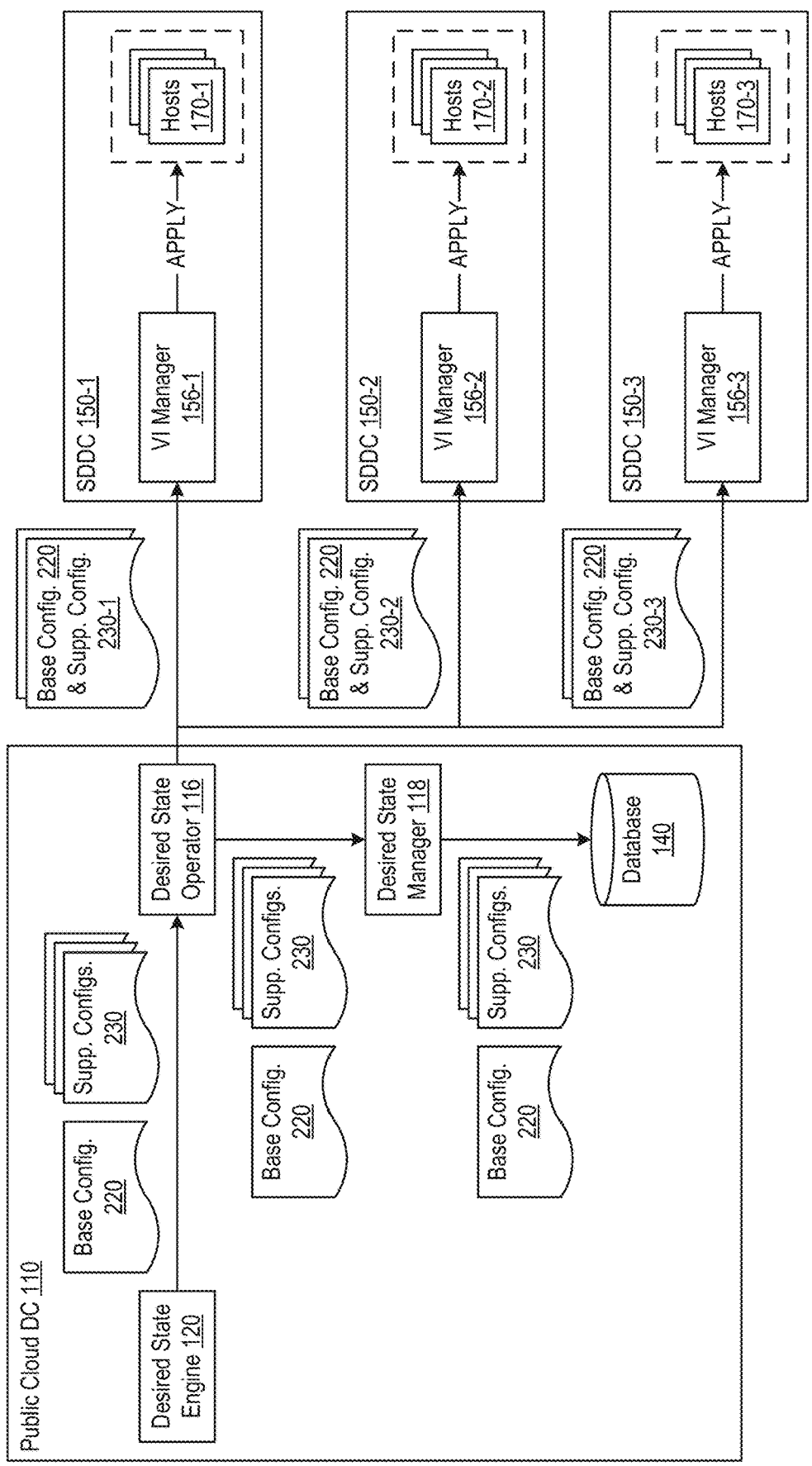
FIG. 2C is a system diagram illustrating the updating of running configuration states of SDDCs according to the base configuration document and corresponding supplemental configuration documents.

FIG. 2C is a system diagram illustrating the updating of running configuration states of SDDCs 150 according to a base configuration document 220 and supplemental configuration documents 230. First, however, to create base configuration document 220 according to the first embodiment, normalizer 122 of desired state engine 120 identifies common properties among legacy desired configuration documents 210 that have the same settings. Normalizer 122 then creates base configuration document 220 and adds the settings for the identified common properties. Additionally, normalizer 122 creates supplemental configuration documents 230. In each of supplemental configuration documents 230, normalizer 122 adds the settings of one of legacy desired configuration documents 210 that were not added to base configuration document 220. Finally, enricher 124 adds tags to base configuration document 220, the tags corresponding to the properties included in supplemental configuration documents 230, as discussed further below.

Desired state engine 120 provides base and supplemental configuration documents 220 and 230 to desired state operator 116, which forwards them to desired state manager 118 for storage in database 140. Desired state operator 116 also issues to each of SDDCs 150-1, 150-2, and 150-3, base configuration document 220 and one of supplemental configuration documents 230 along with an instruction to update the running configuration state of the corresponding SDDC 150 accordingly. In the example of FIG. 2C, desired state operator 116 provides a different one of supplemental configuration documents 230 to each of SDDCs 150. However, in some cases, some of SDDCs 150 may be provided the same supplemental configuration document 230.

VI managers 156-1, 156-2, and 156-3 then stitch together base configuration document 220 and respective supplemental configuration documents 230 to create desired states for respective SDDCs 150. Specifically, VI managers 156 add settings from respective supplemental configuration documents 230 at the locations indicated by the tags inserted into base configuration document 220. VI managers 156 then apply the desired states of hosts 170 and other appliances (not shown) such that the running configuration states of SDDCs 150 match all the settings of the respective desired states.

Figure 2D:
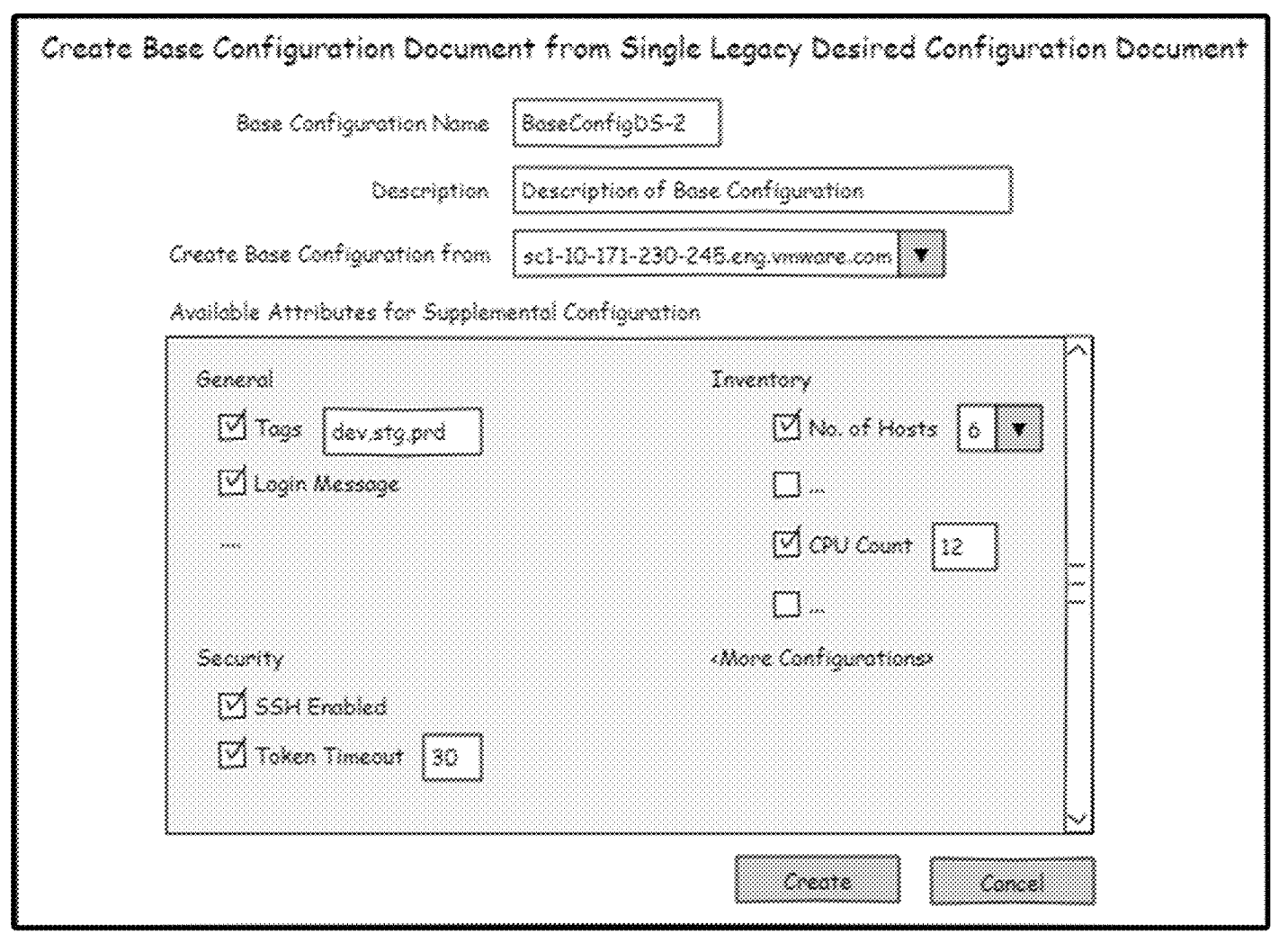

FIG. 2D is an illustration of a UI of cloud interface 102 for creating base configuration document 220 according to a second embodiment in which base configuration document 220 is created from a single legacy desired configuration document. In the illustration of FIG. 2D, the tenant is instead naming base configuration document 220 "BaseConfigDS-2." The UI of FIG. 2D further includes a "Create Base Configuration from" field in which the tenant selects a location of a legacy desired configuration document, e.g., a uniform resource locator (URL). In the illustration of FIG. 2D, the tenant has specified a URL of a database 160-1: "scl-10-171-230-245.eng.vmware.com."

According to the second embodiment, the tenant further specifies which settings of the selected legacy desired configuration document to be included in supplemental configuration document 230 (and not in base configuration document 220). In the illustration of FIG. 2D, the tenant has specified settings of six properties for inclusion in supplemental configuration document 230: settings for "Tags," "Login Message," "SSH," "Token Timeout," "No. of Hosts," and "CPU Count" properties. Accordingly, if the tenant presses "Create," desired state engine 120 creates base configuration document 220 with all the settings of the legacy desired configuration document except those specified by the tenant. Desired state engine 120 also creates supplemental configuration document 230 with the specified settings.

Figure 2E:
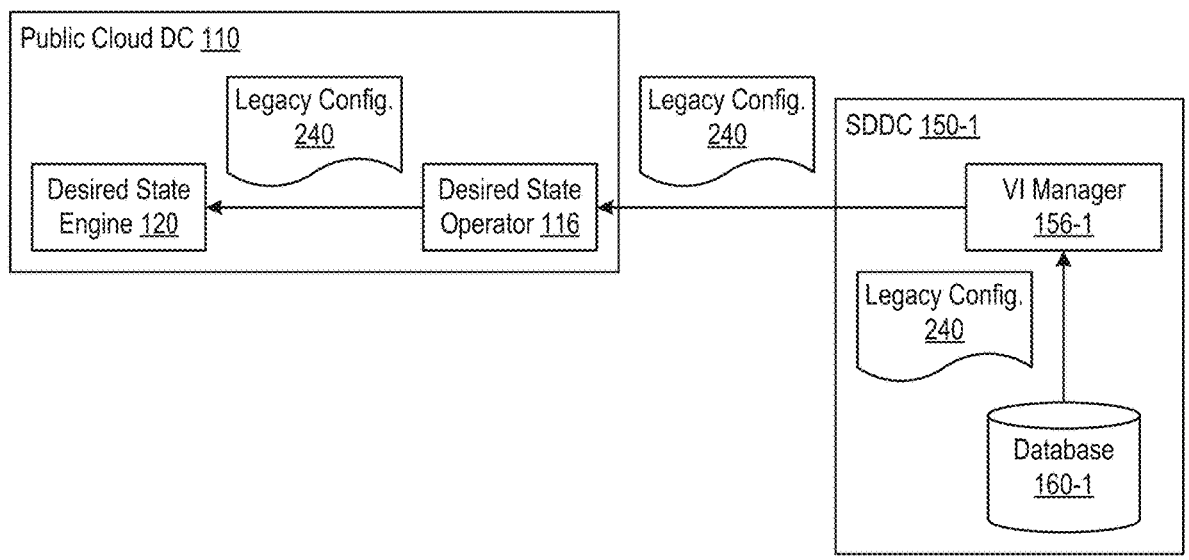
FIG. 2E is a system diagram illustrating the communication of the single legacy desired configuration document to the desired state engine, according to the second embodiment.

FIG. 2E is a system diagram illustrating the communication of a single legacy desired configuration document 240 to desired state engine 120, according to the second embodiment. In the illustration of FIG. 2E, legacy desired configuration document 240 is initially stored in database 160-1 of SDDC 150-1. VI manager 156-1 retrieves legacy desired configuration document 240 and provides it to desired state operator 116. Desired state operator 116 then forwards legacy desired configuration document 240 to desired state engine 120 for the creation of base configuration document 220 and supplemental configuration document 230. Although not illustrated in FIG. 2E, desired state engine 120 then transmits base and supplemental configuration documents 220 and 230 to desired state operator 116. Similarly to FIG. 2C, desired state operator 116 then provides base and supplemental configuration documents 220 and 230 to desired state manager 118 for storage in database 140 and provides them to one or more of SDDCs 150 for application thereto.

FIG. 2F is an illustration of a UI of cloud interface 102 for creating supplemental configuration document 230 for one or more SDDCs 150. In the illustration of FIG. 2F, the tenant is naming supplemental configuration document 230 "SuppConfig-ReduceCompute." The tenant has specified settings of two properties for inclusion in supplemental configuration document 230: settings for "No. Of Hosts" and "CPU Count." Accordingly, if the tenant presses "Create," desired state engine 120 creates supplemental configuration document 230 with the "No. Of Hosts" property set to a minimum of "3" and a maximum of "6," and the "CPU Count" property set to "8."

Furthermore, in the illustration of FIG. 2F, the tenant selects three SDDCs 150 to apply supplemental configuration document 230 to, by checking URLs thereof in the "Apply to Following SDDCs" section. Finally, the tenant specifies to apply supplemental configuration document 230 to selected SDDCs 150 on a schedule by checking the "Enforce from" box. In the three dropdown boxes thereafter, the tenant specifies to apply supplemental configuration document 230 from "10:00 PM" to "06:00 AM" on every "Business Day."

Figure 3A:
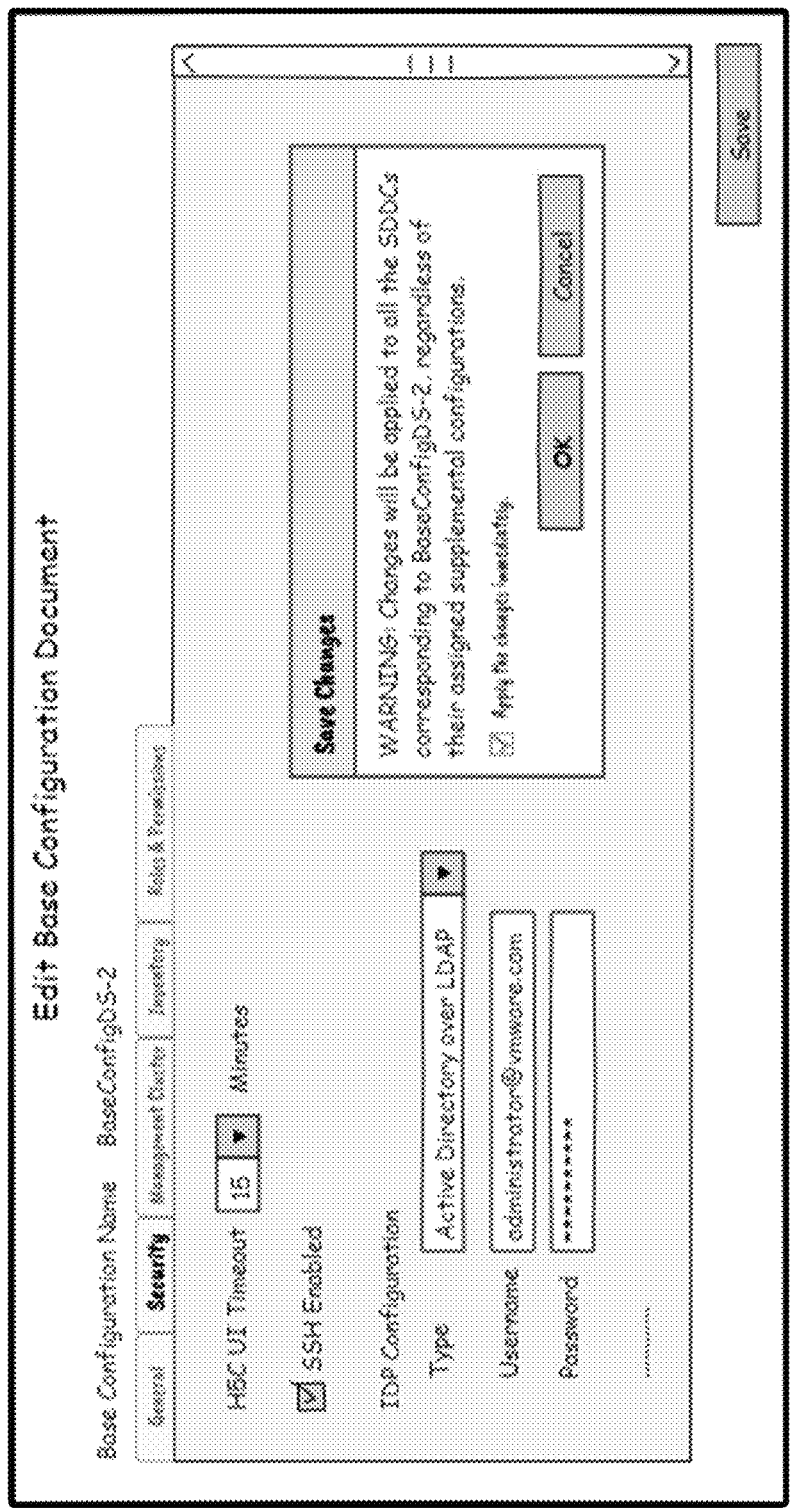
FIG. 3A is an illustration of a UI for adjusting desired settings of the base configuration document.

FIG. 3A is an illustration of a UI of cloud interface 102 for adjusting settings of base configuration document 220. In the illustration of FIG. 3A, the tenant is updating base configuration document 220 identified by the name "BaseConfigDS-2." The tenant has specified adjusting settings of three properties: those of "H5C UI Timeout," "SSH," and "IDP Configuration" properties. The tenant has also pressed "Save," resulting in a prompt indicating that if the tenant updates base configuration document 220, such changes will be applied to corresponding SDDCs 150 for all supplemental configuration documents 230. The prompt also allows the tenant to check a box to apply updates to base configuration document 220 "immediately," i.e., to issue such updates to corresponding SDDCs 150 without delay such as for drift detection. If the tenant presses "OK," cloud control plane 114 updates base configuration document 220.

Figure 3B:
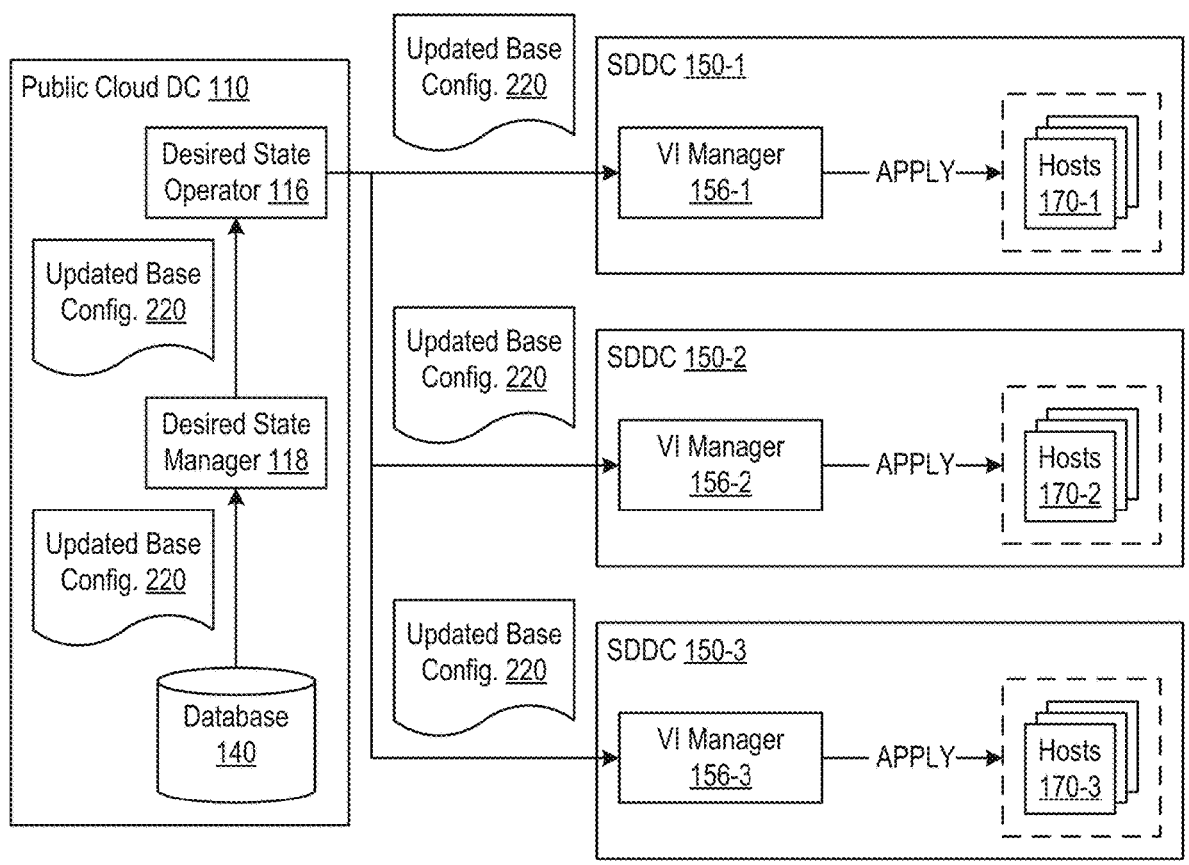
FIG. 3B is a system diagram illustrating the updating of the running configuration states of the SDDCs according to the updated base configuration document.

FIG. 3B is a system diagram illustrating the updating of the running configuration states of SDDCs 150 according to updated base configuration document 220. Desired state operator 116 receives adjustments from the tenant via cloud interface 102 and instructs desired state manager 118 to update database 140 accordingly. Desired state manager 118 updates base configuration document 220 in database 140 and determines from metadata of database 140 which SDDCs 150 correspond to updated base configuration document 220. Desired state manager 118 then provides updated base configuration document 220 to desired state operator 116 along with an indication that updated base configuration document 220 corresponds to all of SDDCs 150-1, 150-2, and 150-3.

Desired state operator 116 then issues updated base configuration document 220 to VI managers 156 along with an instruction to update the running configuration states of respective SDDCs 150 accordingly. It should be noted that SDDCs 150-1, 150-2, and 150-3 may correspond to different supplemental configuration documents 230. However, as indicated in FIG. 3A, any change made to base configuration documents 220 is applied to all corresponding SDDCs 150 regardless of the respective assignments of supplemental configuration documents 230.

Figure 3C:
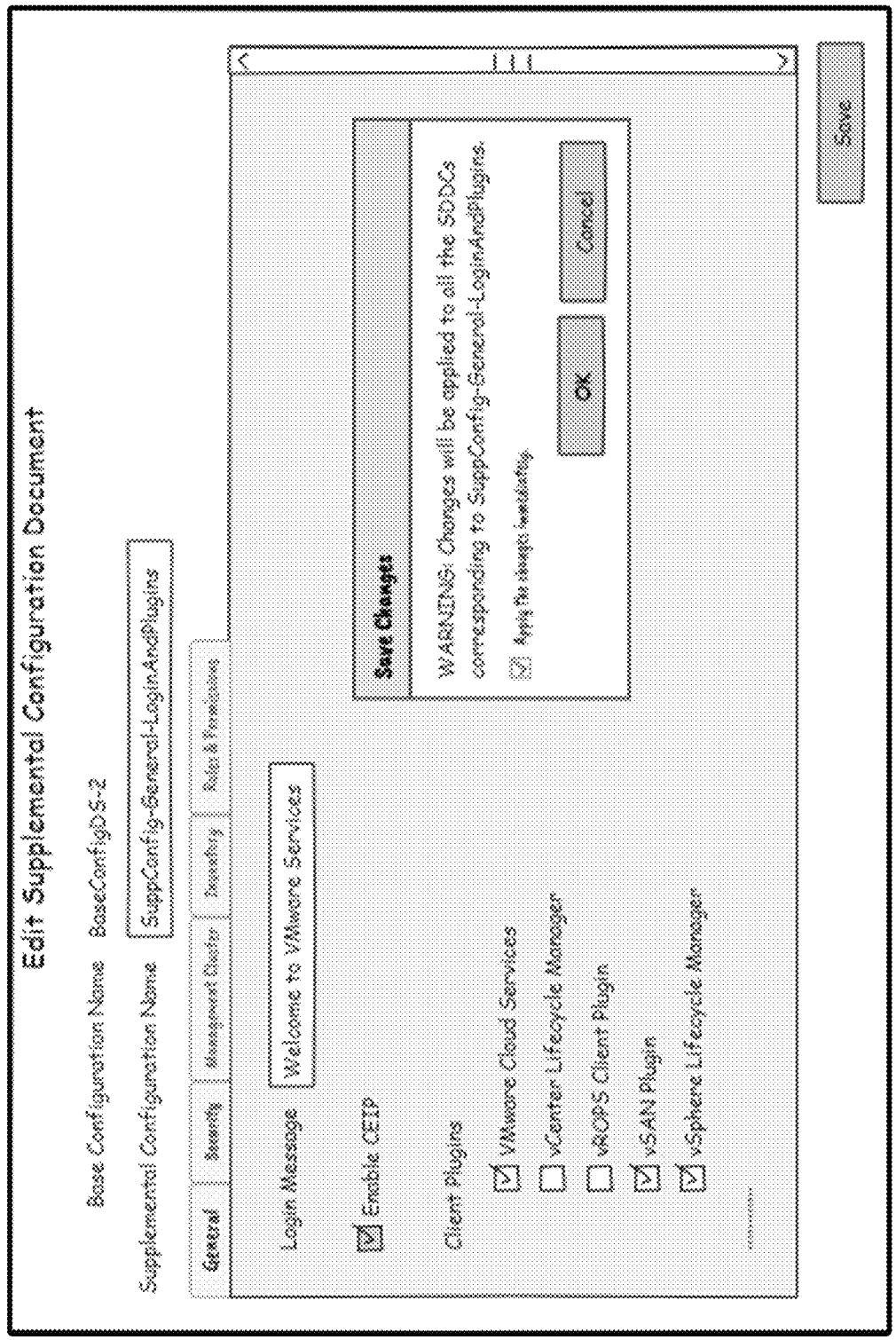
FIG. 3C is an illustration of a UI for adjusting a desired setting of one of the supplemental configuration documents.

FIG. 3C is an illustration of a UI of cloud interface 102 for adjusting settings of one of supplemental configuration documents 230. In the illustration of FIG. 3C, the tenant is updating supplemental configuration document 230-1 identified by the name "SuppConfig-General-LoginAndPlugins." The tenant has specified adjusting settings of "Login Message" and "Enable CEIP" properties along with enabling three plugins: "VMware Cloud Services," "vSAN Plugin," and "vSphere Lifecycle Manager." The tenant has also pressed "Save," resulting in a prompt indicating that if the tenant updates supplemental configuration document 230-1, such changes will be applied to corresponding SDDCs 150, i.e., only to those corresponding to the specified supplemental configuration document 230-1. The changes will not be applied to other SDDCs 150. The prompt also allows the tenant to check a box to apply updates to supplemental configuration document 230 "immediately," i.e., to issue such updates to corresponding SDDCs 150 without delay such as for drift detection. If the tenant presses "OK," cloud control plane 114 updates supplemental configuration document 230-1.

Figure 3D:
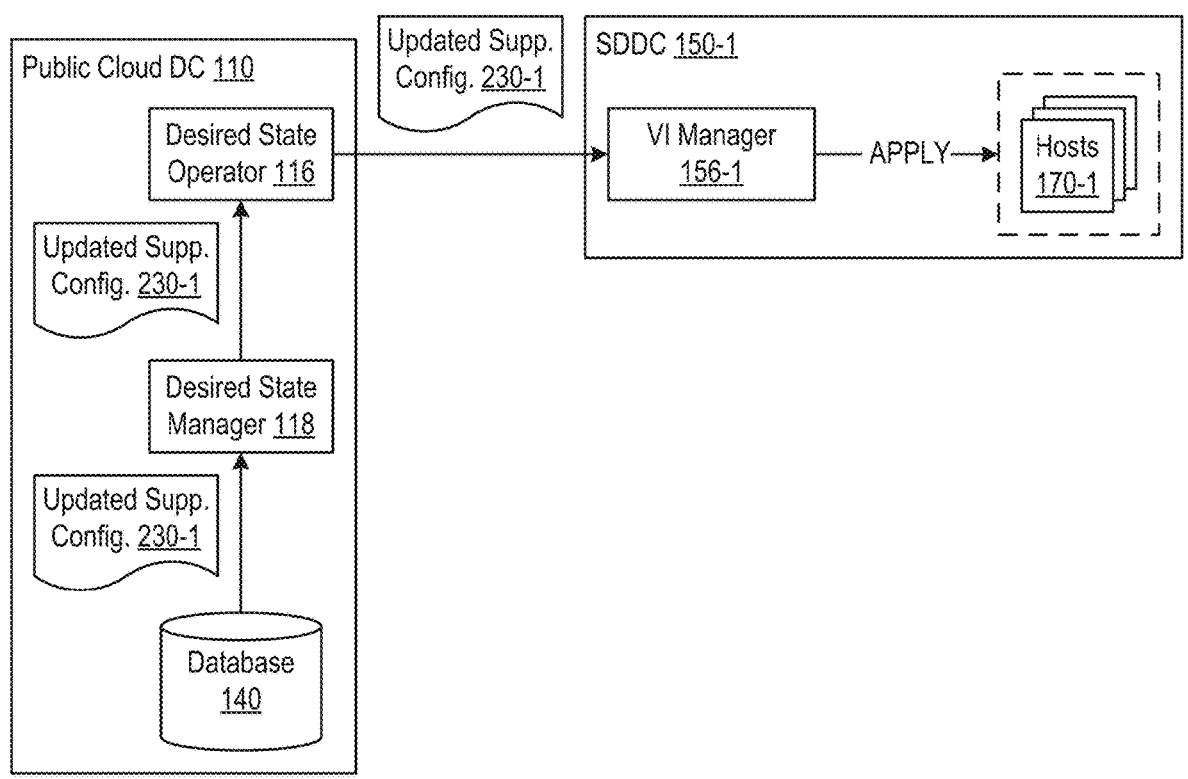
FIG. 3D is a system diagram illustrating the updating of the running configuration state of one of the SDDCs according to the updated supplemental configuration document.

FIG. 3D is a system diagram illustrating the updating of the running configuration state of SDDC 150-1 according to updated supplemental configuration document 230-1. Desired state operator 116 receives adjustments from the tenant via cloud interface 102 and instructs desired state manager 118 to update database 140. Desired state manager 118 updates supplemental configuration document 230-1 in database 140 and determines from metadata of database 140 which SDDCs 150 correspond to updated supplemental configuration document 230-1. Desired state manager 118 then provides updated supplemental configuration document 230-1 to desired state operator 116 along with an indication that updated supplemental configuration document 230-1 only corresponds to SDDC 150-1.

Desired state operator 116 then issues updated supplemental configuration document 230-1 to VI manager 156-1 along with an instruction to update the running configuration state of SDDC 150-1 accordingly. It should be noted that SDDCs 150-1, 150-2, and 150-3 correspond to the same base configuration document 220. However, as indicated in FIG. 3C, any changes made to supplemental configuration document 230-1 are only applied to SDDCs 150 corresponding thereto.

Figure 4A:
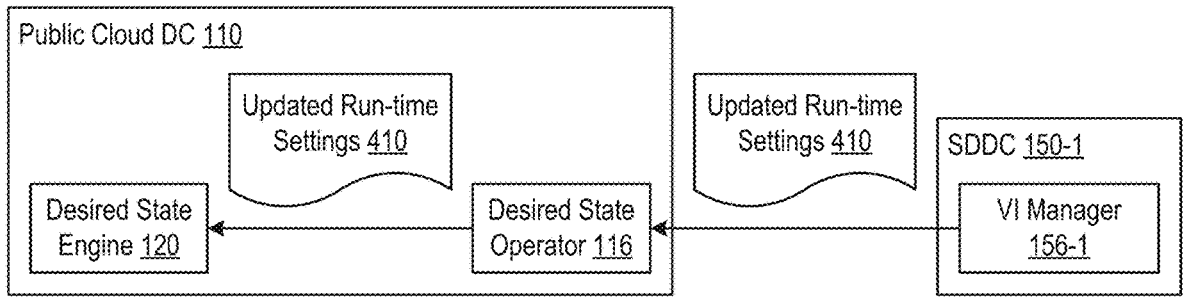
FIG. 4A is a system diagram illustrating the communication of updated run-time settings of one of the SDDCs, to the desired state engine, in response to drift away from a corresponding supplemental configuration document.

FIG. 4A is a system diagram illustrating the communication of updated run-time settings 410 of SDDC 150-1 to desired state engine 120, in response to drift. Sometime after application of a desired state to SDDC 150-1, VI manager 156-1 detects runtime settings of SDDC 150-1 no longer matching corresponding settings of the desired state. For example, the number of hosts 170-1 of SDDC 150-1 may have drifted to below a valid range. Accordingly, VI manager 156-1 communicates updated run-time settings 410, which include those settings that are no longer compliant and optionally other run-time settings of SDDC 150-1. Desired state operator 116 then forwards updated run-time settings 410 to desired state engine 120. Although not illustrated in FIG. 4A, desired state operator 116 also instructs desired state manager 118 to retrieve and provide desired state operator 116 with supplemental configuration documents 230, which desired state operator 116 forwards to desired state engine 120.

Figure 4B:
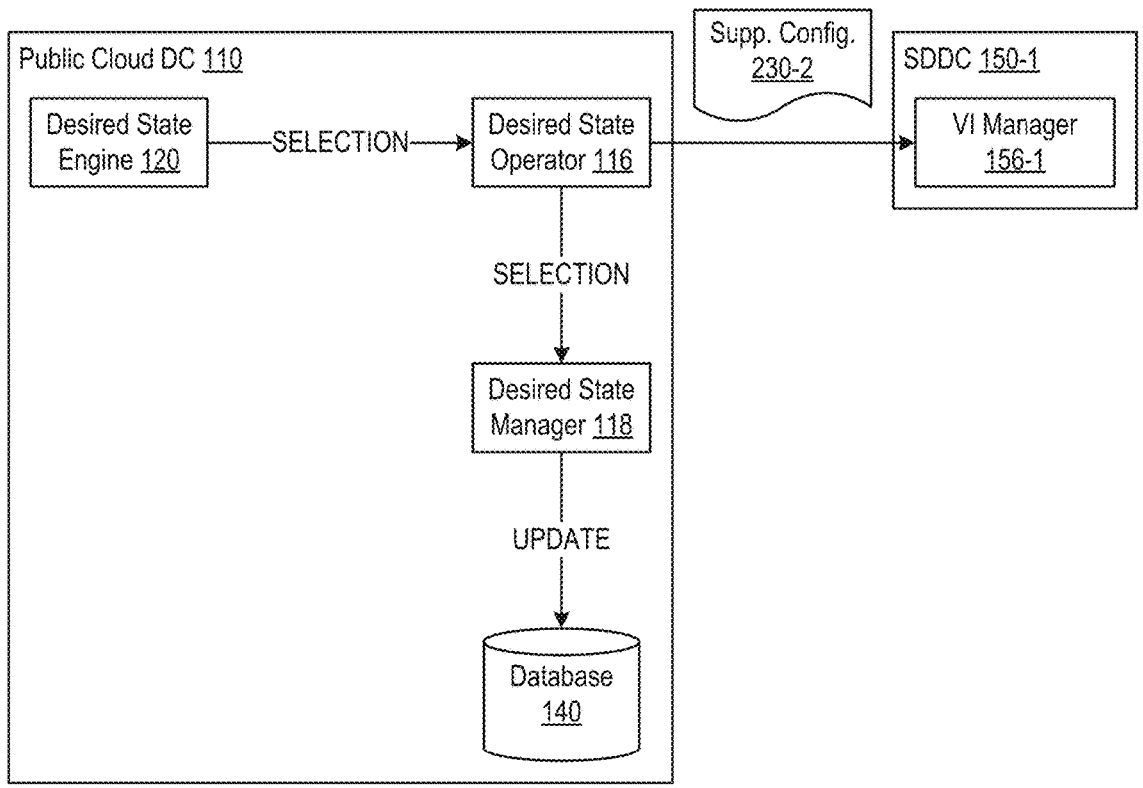
FIG. 4B is a system diagram illustrating the selection and communication to the SDDC of a closest supplemental configuration document.

FIG. 4B is a system diagram illustrating the selection and communication of supplemental configuration document 230-2. In the illustration of FIG. 4B, resolver 126 of desired state engine 120 determines that updated run-time settings 410 are "closest" to supplemental configuration document 230-2 even though supplemental configuration document 230-1 is currently assigned to SDDC 150-1. For example, of supplemental configuration documents 230, supplemental configuration document 230-2 may contain the smallest number of settings that are different from updated run-time settings 410. Accordingly, desired state engine 120 transmits a message to desired state operator 116 indicating that the assignment to SDDC 150-1 should change to supplemental configuration document 230-2.

In response, desired state operator 116 indicates the selection to desired state manager 118, which updates metadata of database 140 to indicate that SDDC 150-1 corresponds to supplemental configuration document 230-2. Desired state operator 116 also provides supplemental configuration document 230-2 to VI manager 156-1, and VI manager 156-1 stores supplemental configuration document 230-2 in database 160. VI manager 156-1 also stitches together a new desired state from base and supplemental configuration documents 220 and 230-2. If there are any run-time settings 410 that are noncompliant with supplemental configuration document 230-2, VI manager 156 updates hosts 170-1 (and other appliances) of SDDC 150-1 accordingly.

It should be noted that desired state engine 120 may also determine that the closest configuration state is that which is already assigned to SDDC 150-1. In such a case, desired state operator 116 provides a message to the tenant via cloud interface 102 indicating that remediation of SDDC 150-1 is necessary and that SDDC 150-1 is already assigned the closest of supplemental configuration documents 130. Desired state operator 116 also indicates to SDDC 150-1 that the desired configuration of SDDC 150-1 is already the closest valid state, and VI manager 156-1 remediates hosts 170 and other appliances accordingly. Additionally, as previously mentioned, instead of responding to reported drift, desired state operator 116 may reassign supplemental configuration documents 230 according to a schedule, e.g., in response to changes in either times of day or days of the week.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of managing configurations of a plurality of software-defined data centers (SDDCs) of a tenant, the plurality of SDDCs including a first SDDC and a second SDDC, the method comprising:
   retrieving a base configuration document of the tenant, a first supplemental configuration document of the first SDDC, and a second supplemental configuration document of the second SDDC;

issuing, to the first SDDC, a first instruction to update a running configuration state of the first SDDC according to the base configuration document and the first supplemental configuration document; and issuing, to the second SDDC, a second instruction to update a running configuration state of the second SDDC according to the base configuration document and the second supplemental configuration document, wherein the base configuration document includes settings of first configuration properties, the settings of the first configuration properties being common across all of the tenant's SDDCs, the first supplemental configuration document includes first settings of second configuration properties, the first settings of the second configuration properties being applicable to the first SDDC but inapplicable to the second SDDC, and the second supplemental configuration document includes second settings of the second configuration properties, the second settings of the second configuration properties being applicable to the second SDDC but inapplicable to the first SDDC.

2. The method of claim 1, wherein in response to the first instruction, the running configuration state of the first SDDC is updated to match all the settings of the first configuration properties and all the first settings of the second configuration properties, and in response to the second instruction, the running configuration state of the second SDDC is updated to match all the settings of the first configuration properties and all the second settings of the second configuration properties.

3. The method of claim 1, further comprising:

creating both the base configuration document and the first supplemental configuration document from a first legacy desired configuration document corresponding to the first SDDC and a second legacy desired configuration document corresponding to the second SDDC, wherein the creation of the base configuration document comprises identifying common settings of desired configuration properties, the common settings being included in both the first and second legacy desired configuration documents, and adding such common settings to the base configuration document as the settings of the first configuration properties, and wherein the creation of the first supplemental configuration document comprises adding, to the first supplemental configuration document, different settings of desired configuration properties as the first settings of the second configuration properties, the different settings being included in the first legacy desired configuration document but being absent from the second legacy desired configuration document.

4. The method of claim 1, further comprising:

creating both the base configuration document and the first supplemental configuration document from a single legacy desired configuration document corresponding to the first SDDC, wherein the tenant selects, from the legacy desired configuration document, the first settings of the second configuration properties, to be included in the first supplemental configuration document, and wherein the legacy desired configuration document includes the settings of the first configuration properties, to be included in the base configuration document.

5. The method of claim 1, further comprising:

in response to a first desired change, the first desired change including a desired adjustment of one of the settings of the first configuration properties, updating the base configuration document to reflect the first desired change, determining that the first and second SDDCs both correspond to the updated base configuration document, and issuing, to both the first and second SDDCs, a third instruction to update the running configuration states of the first and second SDDCs according to the updated base configuration document.

6. The method of claim 5, further comprising:

in response to a second desired change, the second desired change including a desired adjustment of one of the first settings of the second configuration properties, updating the first supplemental configuration document to reflect the second desired change, determining that the updated first supplemental configuration document corresponds to the first SDDC but does not correspond to the second SDDC, and issuing, to the first SDDC, a fourth instruction to update the running configuration state of the first SDDC according to the updated first supplemental configuration document.

7. The method of claim 1, further comprising:

in response to the running configuration state of the first SDDC drifting from at least one of the first settings of the second configuration properties, determining that among the first and second supplemental configuration documents, the second supplemental configuration document contains the smallest number of settings that are different from the running configuration state of the first SDDC, and upon the determination that the second supplemental configuration document contains the smallest number of different settings, issuing the second supplemental configuration document to the first SDDC.

8. The method of claim 1, further comprising:

in response to a change in either a time of a day or a day of a week, issuing the second supplemental configuration document to the first SDDC.

9. A non-transitory computer-readable medium comprising instructions that are executable in a computer system, wherein the instructions when executed cause the computer system to carry out a method of managing configurations of a plurality of software-defined data centers (SDDCs) of a tenant, the plurality of SDDCs including a first SDDC and a second SDDC, the method comprising:

retrieving a base configuration document of the tenant, a first supplemental configuration document of the first SDDC, and a second supplemental configuration document of the second SDDC;

issuing, to the first SDDC, a first instruction to update a running configuration state of the first SDDC according to the base configuration document and the first supplemental configuration document; and issuing, to the second SDDC, a second instruction to update a running configuration state of the second SDDC according to the base configuration document and the second supplemental configuration document, wherein the base configuration document includes settings of first configuration properties, the settings of the first configuration properties being common across all of the tenant's SDDCs, the first supplemental configuration document includes first settings of second configuration properties, the first settings of the second configuration properties being applicable to the first SDDC but inapplicable to the second SDDC, and the second supplemental configuration document includes second settings of the second configuration properties, the second settings of the second configuration properties being applicable to the second SDDC but inapplicable to the first SDDC.

10. The non-transitory computer-readable medium of claim 9, wherein in response to the first instruction, the running configuration state of the first SDDC is updated to match all the settings of the first configuration properties and all the first settings of the second configuration properties, and in response to the second instruction, the running configuration state of the second SDDC is updated to match all the settings of the first configuration properties and all the second settings of the second configuration properties.

11. The non-transitory computer-readable medium of claim 9, the method further comprising:

creating both the base configuration document and the first supplemental configuration document from a first legacy desired configuration document corresponding to the first SDDC and a second legacy desired configuration document corresponding to the second SDDC, wherein the creation of the base configuration document comprises identifying common settings of desired configuration properties, the common settings being included in both the first and second legacy desired configuration documents, and adding such common settings to the base configuration document as the settings of the first configuration properties, and wherein the creation of the first supplemental configuration document comprises adding, to the first supplemental configuration document, different settings of desired configuration properties as the first settings of the second configuration properties, the different settings being included in the first legacy desired configuration document but being absent from the second legacy desired configuration document.

12. The non-transitory computer-readable medium of claim 9, the method further comprising:

creating both the base configuration document and the first supplemental configuration document from a single legacy desired configuration document corresponding to the first SDDC, wherein the tenant selects, from the legacy desired configuration document, the first settings of the second configuration properties, to be included in the first supplemental configuration document, and wherein the legacy desired configuration document includes the settings of the first configuration properties, to be included in the base configuration document.

13. The non-transitory computer-readable medium of claim 9, the method further comprising:

in response to a first desired change, the first desired change including a desired adjustment of one of the settings of the first configuration properties, updating the base configuration document to reflect the first desired change, determining that the first and second SDDCs both correspond to the updated base configuration document, and issuing, to both the first and second SDDCs, a third instruction to update the running configuration states of the first and second SDDCs according to the updated base configuration document.

14. The non-transitory computer-readable medium of claim 13, the method further comprising:

in response to a second desired change, the second desired change including a desired adjustment of one of the first settings of the second configuration properties, updating the first supplemental configuration document to reflect the second desired change, determining that the updated first supplemental configuration document corresponds to the first SDDC but does not correspond to the second SDDC, and issuing, to the first SDDC, a fourth instruction to update the running configuration state of the first SDDC according to the updated first supplemental configuration document.

15. The non-transitory computer-readable medium of claim 9, the method further comprising:

in response to the running configuration state of the first SDDC drifting from at least one of the first settings of the second configuration properties, determining that among the first and second supplemental configuration documents, the second supplemental configuration document contains the smallest number of settings that are different from the running configuration state of the first SDDC, and upon the determination that the second supplemental configuration document contains the smallest number of different settings, issuing the second supplemental configuration document to the first SDDC.

16. The non-transitory computer-readable medium of claim 9, the method further comprising:

in response to a change in either a time of a day or a day of a week, issuing the second supplemental configuration document to the first SDDC.

17. A computer system comprising:

a plurality of servers including a control plane that is configured to:

retrieve a base configuration document of a tenant, a first supplemental configuration document of a first software-defined data center (SDDC), and a second supplemental configuration document of a second SDDC, issue, to the first SDDC, a first instruction to update a running configuration state of the first SDDC according to the base configuration document and the first supplemental configuration document, and issue, to the second SDDC, a second instruction to update a running configuration state of the second SDDC according to the base configuration document and the second supplemental configuration document, wherein the base configuration document includes settings of first configuration properties, the settings of the first configuration properties being common across all of the tenant's SDDCs, the first supplemental configuration document includes first settings of second configuration properties, the first settings of the second configuration properties being applicable to the first SDDC but inapplicable to the second SDDC, and the second supplemental configuration document includes second settings of the second configuration properties, the second settings of the second configuration properties being applicable to the second SDDC but inapplicable to the first SDDC.

18. The computer system of claim 17, wherein
in response to the first instruction, the running configuration state of the first SDDC is updated to match all the settings of the first configuration properties and all the first settings of the second configuration properties, and
in response to the second instruction, the running configuration state of the second SDDC is updated to match all the settings of the first configuration properties and all the second settings of the second configuration properties.

19. The computer system of claim 17, where the control plane is further configured to:
create both the base configuration document and the first supplemental configuration document from a first legacy desired configuration document corresponding to the first SDDC and a second legacy desired configuration document corresponding to the second SDDC,
wherein the creation of the base configuration document comprises identifying common settings of desired configuration properties, the common settings being included in both the first and second legacy desired configuration documents, and adding such common settings to the base configuration document as the settings of the first configuration properties, and
wherein the creation of the first supplemental configuration document comprises adding, to the first supplemental configuration document, different settings of desired configuration properties as the first settings of the second configuration properties, the different settings being included in the first legacy desired configuration document but being absent from the second legacy desired configuration document.

20. The computer system of claim 17, wherein the control plane is further configured to:
create both the base configuration document and the first supplemental configuration document from a single legacy desired configuration document corresponding to the first SDDC,
wherein the tenant selects, from the legacy desired configuration document, the first settings of the second configuration properties, to be included in the first supplemental configuration document, and
wherein the legacy desired configuration document includes the settings of the first configuration properties, to be included in the base configuration document.

21. The computer system of claim 17, wherein the control plane is further configured to:
in response to a first desired change, the first desired change including a desired adjustment of one of the settings of the first configuration properties,
update the base configuration document to reflect the first desired change,
determine that the first and second SDDCs both correspond to the updated base configuration document, and
issue, to both the first and second SDDCs, a third instruction to update the running configuration states of the first and second SDDCs according to the updated base configuration document.

22. The computer system of claim 21, wherein the control plane is further configured to:
in response to a second desired change, the second desired change including a desired adjustment of one of the first settings of the second configuration properties,
update the first supplemental configuration document to reflect the second desired change,
determine that the updated first supplemental configuration document corresponds to the first SDDC but does not correspond to the second SDDC, and
issue, to the first SDDC, a fourth instruction to update the running configuration state of the first SDDC according to the updated first supplemental configuration document.

23. The computer system of claim 17, wherein the control plane is further configured to:
in response to the running configuration state of the first SDDC drifting from at least one of the first settings of the second configuration properties,
determine that among the first and second supplemental configuration documents, the second supplemental configuration document contains the smallest number of settings that are different from the running configuration state of the first SDDC, and
upon the determination that the second supplemental configuration document contains the smallest number of different settings, issue the second supplemental configuration document to the first SDDC.

24. The computer system of claim 17, wherein the control plane is further configured to:
in response to a change in either a time of a day or a day of a week, issue the second supplemental configuration document to the first SDDC.

* * * * *